Aug. 29, 1944.  W. O. BENNETT, JR  2,356,911
BALANCE WHEEL
Filed Dec. 19, 1941
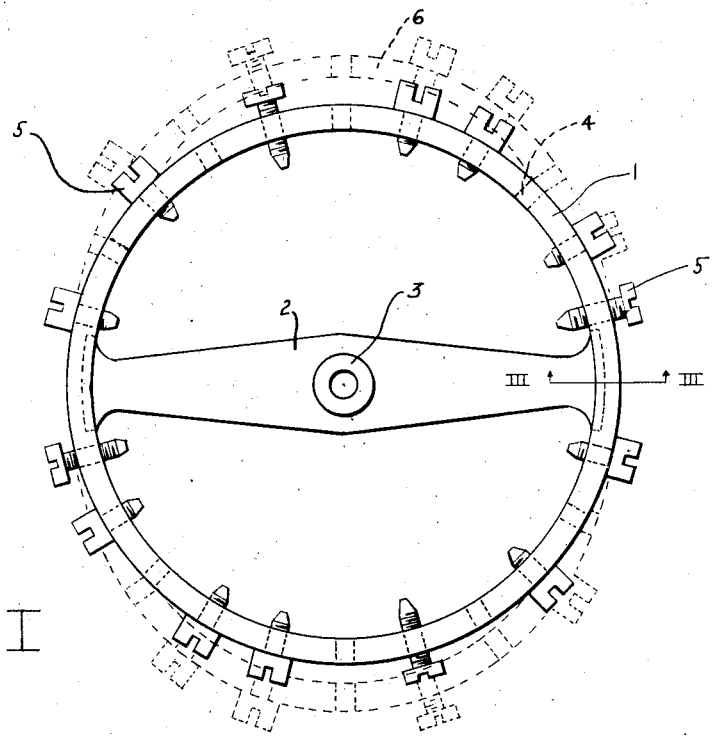
Fig. I
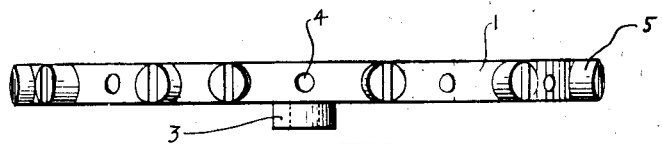
Fig. II
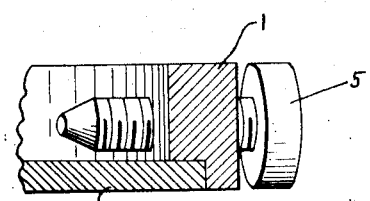
Fig. III
INVENTOR.
William O. Bennett, Jr.
BY James M. Heilman
ATTORNEYS.

Patented Aug. 29, 1944

2,356,911

UNITED STATES PATENT OFFICE 2,356,911

BALANCE WHEEL

William Ogle Bennett, Jr., Lancaster, Pa., assignor to Hamilton Watch Company, Lancaster, Pa.

Application December 19, 1941, Serial No. 423,607

11 Claims. (Cl. 58—108)

This invention has for its object the provision of a wheel structure adapted to have improved action under an adjustability of mass to the application of heat or cold, and the method of forming the structure.

Another object is to provide a peripherally continuous wheel adapted to be deformed more in some directions than others, under the action of heat or cold.

Another object is to provide a peripherally continuous balance wheel adapted to be deformed more in some directions than others, under the action of heat or cold, and having means for varying the mass carried by the portion of greater deformation of the wheel.

Another object is to provide a balance wheel having a peripheral portion formed entirely of a material of one coefficient of expansion, and a cross bar formed of a material of a different coefficient of expansion.

Other and further objects will be clearly apparent from the following specifications and from the drawing.

Referring to the drawing:

Fig. I is a plan view of a device embodying this invention and illustrating its deformation under the action of heat;

Fig. II is an elevation of the structure of Fig. I; and

Fig. III is an enlargement of a section taken on line III—III of Fig. I.

Many attempts have been made to provide a timepiece balance wheel which is, when it and its associated hairspring are subjected to heat or cold, accurately adjustable so as to automatically compensate for changes in the action of the hairspring and to avoid rate changes in the timepiece due to temperature changes as applied to the balance wheel and hairspring.

This invention is directed to the accomplishment of the above purpose without departing from the unbroken wheel type of structure which is desirable because of its uniformity of mass distribution, stability of radial dimension, and freedom from need of contour adjustment and without departing from the use of a material in its natural state, that is, with no attempt at composition or crystal arrangement to influence the expansion or contraction of the material.

Such departures render the wheel unstable in its expansion and and contraction and make it difficult to adjust for proper compensation.

The device of this invention comprises an unbroken wheel of a material in its normal state with respect to its action under the influence of heat or cold.

It is provided with a peripheral portion of a material having one coefficient of expansion and a cross bar of a material having a different coefficient of expansion.

For example, the cross bar may be of "Invar" type material, having substantially zero coefficient of thermal expansion, and the peripheral ring may be of stainless steel, which has a substantial coefficient of thermal expansion.

Application of heat or cold to a normally circular structure of this nature will cause it to assume an ellipse-like contour, and location of more or less mass with respect to the portion of the wheel capable of greatest movement will provide an adjustment to control the effect of the heat or cold on the moment of inertia of the wheel.

It is to be understood that various uses to which this principle may be put readily come within the scope of this invention.

In the form illustrated in the drawing this invention comprises a timepiece balance wheel having a peripheral, unbroken and normally circular portion 1 and a cross bar 2 with a central support bearing 3. The peripheral ring is provided with openings 4 uniformly and diametrically oppositely positioned throughout its extent. Within some of these openings screws 5 are located. These screws may be adjusted radially of the wheel, or moved to different holes, as a provision for varying the mass carried by the wheel at different points on its periphery, and the distance of the mass from the center of the wheel.

The dotted elliptical shape 6, of Fig. I, illustrates the deformation of the wheel when heat is applied in the instance when the coefficient of expansion of the peripheral ring is greater than that of the cross bar. For emphasis, the cross bar 2 is shown as having zero coefficient of expansion so that the change lies entirely in the ellipse formation of the peripheral ring.

When using a hairspring which reacts to heat in such a manner as to grow stronger and consequently cause the wheel to oscillate more rapidly, the arrangement of Fig. I is readily adapted to automatically compensate for the tendency to increase the rate of oscillation of the wheel, since a portion of its mass is moved by the ellipse formation to a point more distant from the center of the wheel with a consequent tendency to slow the wheel oscillation and compensate for the increased rate of oscillation afforded by the strengthened hairspring.

The amount of this compensation is readily varied by moving the mass screws 5 to positions in the peripheral ring 1 with respect to the cross bar 2 so as to include more or less mass in the ellipse forming movement of the ring 1.

If desired, instead of using screws movable to different holes about the periphery, the movable mass may take the form of a weight or weights arranged for adjustment about the periphery of the wheel, or any other suitable means of moving the preponderance of mass about the periphery of the wheel.

This arrangement of the screws 5 plus the more delicate adjustment afforded by the threaded holes 4 and the possible movement of the screws in the holes toward and away from the center of the wheel, provides ready and accurate balancing of the expansion of the wheel with the increase in strength of the hairspring.

A hairspring of material such as "Elinvar" is one which may increase in strength under the action of heat.

The structure of this invention is a stable one as regards expansion coefficient since its materials are in their normal state and consequently provide uniformity of expansion throughout each material.

An alternate construction, which would be desirable for use with a hairspring which is weakened by the application of heat, is to form the cross bar of material of a greater coefficient of expansion than the material of the rim.

Such a structure may be so formed as regard to dimensions and strength of materials as to permit the cross bar 2 to expand and draw portions of the rim 1 toward the center of the wheel, just opposite to the action illustrated in Fig. I. With sufficient mass involved in the motion toward the center upon the application of heat, the movement of mass at the ends of the cross bar away from the center, and the weakening of the hairspring with the consequent tendency to reduce the speed of oscillation of the wheel, would be balanced by the increased tendency to increase the speed of oscillation in accordance with the movement of mass toward the center of the wheel, and a stabilized rate of oscillation would result.

A feature of this invention is the ease of manufacture of the device. It is simple and inexpensive to separately form the ring 1 of one material and the cross bar 2 of another and then join them in a suitable manner, as, for instance, shown in Fig. III, by brazing, screwing, or other suitable joining means.

After the ring and cross bar have been joined, the structure is heat treated to remove cold working strains and produce uniformity of action upon the application of heat or cold.

What I claim is:

1. In a single rim balance wheel, means for controlling the rate of change of moment of inertia with change of temperature comprising a crossbar formed of a different metal from that of the rim, said respective metals having relatively different coefficients of expansion.

2. In a single rim balance wheel, means for controlling the rate of change of moment of inertia with change of temperature comprising an adjustable mass carried on said rim and a crossbar, said single rim and crossbar being formed respectively of different metals having relatively different coefficients of expansion.

3. In a single rim balance wheel, means for controlling the rate of change of moment of inertia with change of temperature comprising masses adjustable to different positions carried at diametrically opposed positions on said rim and a crossbar, said single rim and crossbar respectively being formed of different metals having relatively different coefficients of expansion.

4. In a single rim balance wheel, means for controlling the rate of change of moment of inertia with change of temperature said rim being formed with a series of spaced diametrically opposed holes, masses carried in certain of said holes and a crossbar, said single rim and crossbar respectively being formed of different metals having relatively different coefficients of expansion.

5. In a single rim balance wheel, means for controlling the rate of change of moment of inertia with change of temperature said rim being formed with a series of spaced diametrically opposed holes, masses carried in certain of the holes, means for varying the effect of said masses on said rim and a crossbar, said single rim and crossbar respectively being formed of different metals having relatively different coefficients of expansion.

6. In a single rim balance wheel, means for controlling the rate of change of moment of inertia with change of temperature, said rim being formed with a series of uniformly spaced holes, masses interchangeably carried in certain of said holes, and a crossbar, said single rim and crossbar respectively being formed of different metals having relatively different coefficients of expansion.

7. In a single rim balance wheel, means for controlling the rate of change of moment of inertia with change of temperature, said rim being formed with a series of uniformly spaced diametrically opposed holes, screws carried in certain of said holes, and a crossbar, said single rim and crossbar respectively being formed of different metals having relatively different coefficients of expansion.

8. In a balance wheel, a means for controlling the rate of change of moment of inertia with change of temperature comprising a monometallic rim, adjustable masses carried by said rim and a crossbar secured to said rim at diametrically opposite points, said rim and crossbar respectively being formed of different metals having respective different coefficients of expansion.

9. In a balance wheel, a means for controlling the rate of change of moment of inertia with changes of temperature comprising a monometallic rim formed of a metal having a relative high coefficient of expansion, masses adjustable as to position carried on said rim and a crossbar secured to said rim at diametrically opposite points, said crossbar being formed of a metal other than that of the rim having a relatively low coefficient of expansion.

10. In a balance wheel, a means for controlling the rate of change of moment of inertia with change of temperature comprising a monometallic rim of stainless steel, masses adjustably carried by said rim, and a crossbar formed of Invar secured at diametrically opposite points to said rim.

11. In a balance wheel, a means for controlling the rate of change of moment of inertia with change of temperature comprising a monometallic rim of stainless steel formed with a series of uniformly spaced diametrically opposed threaded holes, screws interchangeably carried in certain of said holes, and a crossbar formed of Invar secured at diametrically opposite points to said rim.

WILLIAM OGLE BENNETT, Jr.